United States Patent
Burns et al.

(10) Patent No.: US 7,974,806 B1
(45) Date of Patent: Jul. 5, 2011

(54) METHOD FOR ROLLING COMPENSATION WITH WHEEL-MOUNTED SENSORS

(75) Inventors: Leigh R. Burns, Troy, IL (US); Michael T. Stieff, Wentzville, MO (US); James W. McClenahan, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 12/556,376

(22) Filed: Sep. 9, 2009

Related U.S. Application Data

(60) Provisional application No. 61/095,356, filed on Sep. 9, 2008.

(51) Int. Cl.
*G01M 1/38* (2006.01)
(52) U.S. Cl. ........................................................ 702/105
(58) Field of Classification Search .................... 702/105
See application file for complete search history.

(56) References Cited

U.S. PATENT DOCUMENTS

| | | | |
|---|---|---|---|
| 4,138,825 A | 2/1979 | Pelta | |
| 4,180,915 A | 1/1980 | Lill et al. | |
| 4,336,658 A | 6/1982 | January et al. | |
| 4,953,296 A | 9/1990 | Spainhour | |
| 5,018,853 A | 5/1991 | Hechel et al. | |
| 5,052,111 A | 10/1991 | Carter et al. | |
| 5,519,489 A | 5/1996 | McClenahan et al. | |
| 5,535,522 A | 7/1996 | Jackson | |
| 5,724,128 A | 3/1998 | January | |
| 5,943,783 A | 8/1999 | Jackson | |
| 5,969,246 A | 10/1999 | Jackson et al. | |
| 6,219,134 B1 | 4/2001 | Voeller et al. | |
| 6,894,771 B1 | 5/2005 | Dorrance et al. | |
| 7,313,869 B1 | 1/2008 | Rogers et al. | |
| 7,336,350 B2 | 2/2008 | Dorrance et al. | |

FOREIGN PATENT DOCUMENTS

WO      2008072276 A1      6/2008

OTHER PUBLICATIONS

WO 2008/072276, Torri Giancarlo, International Publication Date Jun. 19, 2008.*

* cited by examiner

*Primary Examiner* — Tung S Lau
(74) *Attorney, Agent, or Firm* — Polster, Lieder, Woodruff & Lucchesi, L.C.

(57) ABSTRACT

A method for compensating axial misalignment between wheel-mounted alignment sensors and an axis of rotation for an associated wheel. The method compensates sensors mounted to each wheel of a vehicle simultaneously, without requiring jacking of the vehicle wheels above a supporting surface, and which only requires wheel rotational movement over an arc of 60 degrees or less. The method utilizes measurements of a change in a wheel toe angle and measurements of a change in a wheel camber angle, during a measured rotational movement of the wheel, to identify sinusoidal variation in the respective toe and camber angles during the wheel's rotational movement, from which a measure of axial misalignment between the wheel-mounted alignment sensor axis of rotation and the wheel axis of rotation is identified.

15 Claims, 6 Drawing Sheets

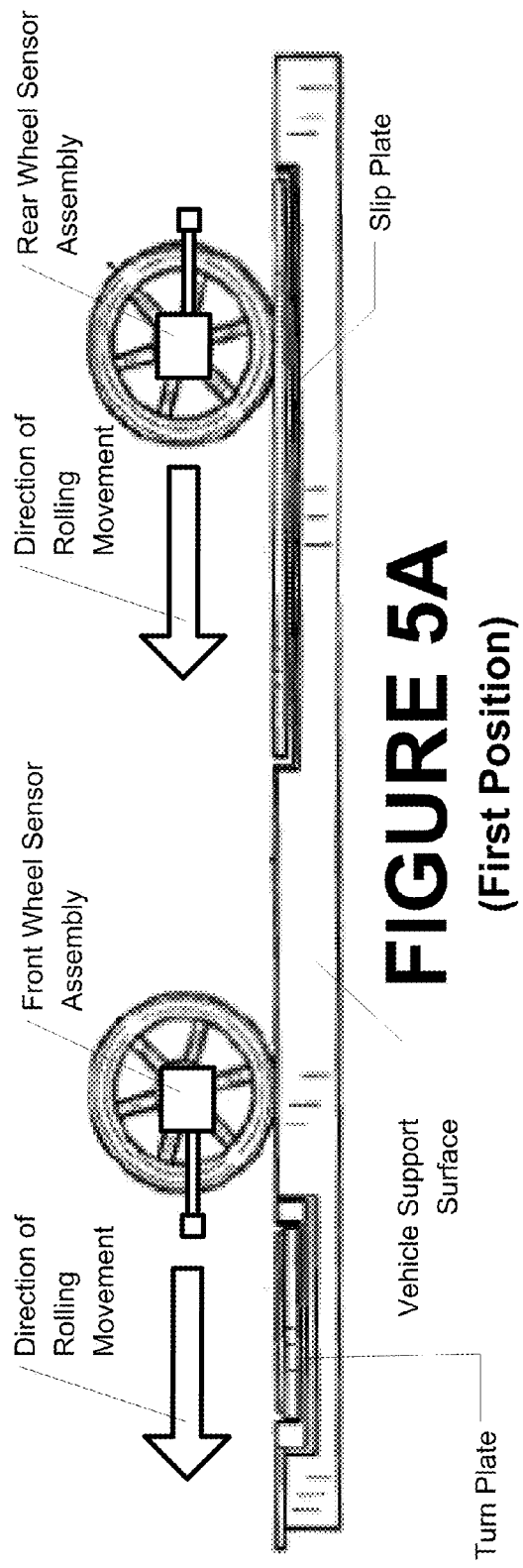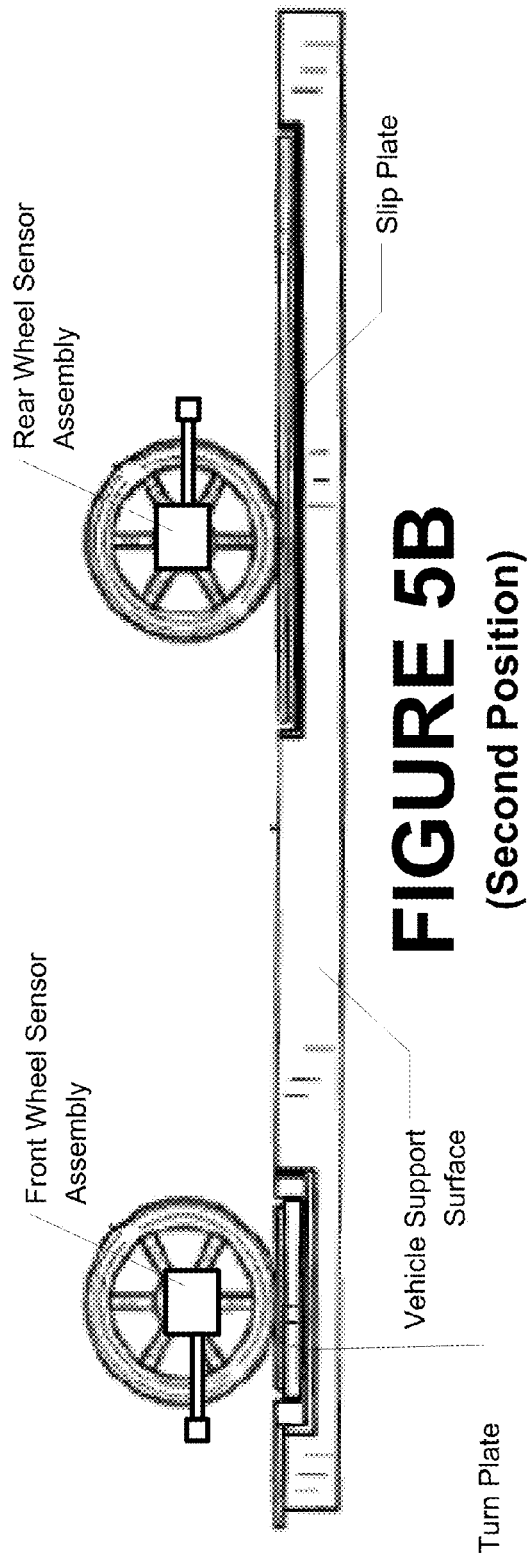

METHOD FOR ROLLING COMPENSATION WITH WHEEL-MOUNTED SENSORS

CROSS-REFERENCE TO RELATED APPLICATIONS

The present application is related to, and claims priority from, U.S. Provisional Patent Application Ser. No. 61/095,356 filed on Sep. 9, 2008, and which is herein incorporated by reference.

STATEMENT REGARDING FEDERALLY SPONSORED RESEARCH

Not Applicable.

BACKGROUND OF THE INVENTION

The present invention is related generally to vehicle wheel alignment systems, and in particular, to a method for compensating for axial misalignment between wheel-mounted alignment sensors and the wheel axis of rotation by rolling the wheel-mounted sensors together with the associated vehicle wheels about a limited range of movement.

In any wheel alignment system the orientation of the axis of rotation of the vehicle wheels must be determined before alignment angles of the wheels can be calculated. In an ideal world, the alignment system sensors would be mounted to the wheels such that they would be perfectly lined up with the axis of rotation of the wheels and measurements could be directly obtained. However, it is necessary to accommodate the reality of an imperfection in mounting a sensor on a wheel. This is accomplished by performing a compensation procedure which consists of observing camber angle and/or toe angle changes measured by the sensor at different rotational positions of the associated wheel, caused by any eccentricity in the mounting of the sensor to the wheel.

There are many different types of wheel alignment systems currently available. For example, as is shown in FIG. 1, a conventional 6-sensor system utilizes sensors mounted at each vehicle wheel, with an extra set of cross-looking sensors associated with the front vehicle wheels. FIG. 2 illustrates a variation of the sensor system of FIG. 1, in which illuminated lights are disposed on one vehicle wheel (typically a rear wheel), and their relative positions are observed by sensors mounted on an adjacent wheel (typically a front wheel) to determine wheel alignment angles.

Before electronic tilt sensors were commonly available, compensation for the eccentric mounting of a sensor assembly onto a vehicle wheel was accomplished mechanically. The time consuming mechanical compensation process requires a series of incremental adjustments to adjusting screws on the sensor mounting after the fitment to a wheel assembly, such that a bubble level on the mounting is maintained a constant position as the wheel assembly is rotated. The process requires the wheel to be jacked up off a supporting surface, and requires several full 360 degree rotations of the wheel to ensure accurate compensation is achieved.

Some conventional wheel alignment systems employing wheel-mounted sensors use a compensation procedure that requires readings at only two wheel rotation positions that are 180 degrees apart. The offset for the axis of rotation is found by averaging the readings from each position. While this method is simple, error is introduced if, during the remainder of the alignment procedure, the wheels are allowed to roll away from the rotational position at which the compensation setting was calculated. Also, the vehicle must be jacked up above the supporting surface to achieve the required 180 degrees of wheel rotation.

Another known compensation method for wheel-mounted sensors requires measurements at three separate wheel rotational positions. The readings from the sensors are then fitted to a sine wave, which is analyzed to determine the amplitude and phase of the mounted sensor error with respect to the axis of rotation of the wheel. Once the relationship is established, the wheel can be subsequently rolled to any rotational position and an accurate compensation value determined from the corresponding values of the fitted sine wave. However, this method requires the wheel to be jacked up off the supporting surface to accomplish at least 240 degrees of wheel roll, as described in U.S. Pat. No. 5,052,111 to Carter et al.

An alternate method of sensor compensation requires a very accurately machined wheel adapter to be used in conjunction with special machined provisions on the wheel and brake hub. When the adapter is mounted on the wheel in a precise and predetermined mounting using the machined provisions, the axis of the adapter is in line with the axis of rotation of the wheel. A pre-compensated sensor is then mounted in the perfectly aligned socket of the wheel adapter and readings can be obtained without the need to jack up the car and roll the wheel. However, any foreign objects in, or damage to, the interface between the wheel adapter and the machined provisions on the hub will cause erroneous readings. This method is expensive for both the car manufacturer and the alignment equipment manufacturer due to the precision machining required.

The above compensation methods are generally useful, but could be time consuming or prone to error. A more efficient rolling compensation method was introduced along with machine-vision style wheel alignment systems employing optical targets mounted to each wheel of a vehicle, such as those shown in U.S. Pat. Nos. 5,535,522, 5,724,743, and 5,943,783. Generally, machine-vision vehicle wheel alignment systems employ cameras or imaging sensors to view the front wheels and rear wheels of a vehicle disposed on a vehicle lift rack or other supporting surface. Optical targets are affixed to the respective vehicle wheels, and are observed by the cameras or imaging sensors, which are in turn coupled to a computer having an associated memory and display. The computer processes the resulting images, is programmed to process mathematical transforms on the resulting data from which wheel alignment angles are determined.

The rolling compensation procedure, illustrated generally by the rearward and forward rolling movement of the vehicle wheel on the supporting surface as shown in FIGS. 3A-3C, can be accomplished with a minimal wheel rotational movement of only 30 to 60 degrees. All four wheels are rolled at the same time by pushing (or pulling) the vehicle and no jacking is required. The procedure is quick to perform and accurately compensates for errors in the mounting of a wheel adapter. However, this rolling compensation method has traditionally been restricted to systems using machine-vision technology to observe the motion of the wheel-mounted optical targets during the rolling movement.

Wheel alignment system which utilize machine-vision technology require at least one camera with a two-dimensional imager array and at least one wheel-mounted target. The typical system has the cameras mounted remotely from the vehicle while the targets are affixed to the wheels of the vehicle. In these systems, the method of compensation disclosed in the above patents acquires images of the target in multiple positions during the wheel rotation procedure. The images are processed by the computer to identify a surface of revolution of each target generated by the rotational movement of the associated wheel. An axis of rotation for the surface of revolution is identified, and established as the rotational axis of the associated wheel. Alternatively, the conical path traced by the surface normal of the "claw" plane can also be used to find the axis of rotation, as is described in U.S. Pat. No. 5,969,246 to Jackson.

Recently, a hybrid wheel alignment system has been introduced where cameras are mounted with adapters onto the rear wheels of a vehicle, and are configured to observe optical targets which are mounted with adapters onto the front wheels of the vehicle, as shown in U.S. Pat. No. 7,313,869 B1 to Rogers. Compensation with this system is accomplished by using separate procedures for the front sensors and for the rear sensors, effectively doubling the operators work load. The rear sensors, containing the cameras, also incorporate camber transducers which are used to perform a conventional compensation requiring anywhere from 180 to 360 degrees of wheel roll. The front wheels are then compensated with the standard machine-vision methods using the surface of revolution generated by the offset targets as the wheels roll. These complicated compensation requirements of the hybrid system are a major disadvantage. If the vehicle is rolled for compensation then it must be rolled far enough to complete at least 180 degrees of wheel rotation as required to compensate the rear sensors. If it is not rolled, then jacking the vehicle above the supporting surface is necessary while the front and rear wheels are rotated separately for the compensation procedures. These limitations exist because there is no means available at the rear wheel to generate the surface of revolution necessary for machine vision compensation unless an additional fixed reference target is present in the field of view. Hence, the hybrid system as implemented by the '869 Rogers patent provides no operational compensation advantage over a conventional wheel-mounted alignment systems due to the restricted compensation methods required for the different types of sensors.

However, complete machine-vision alignment systems utilizing only the rolling compensation procedures do provide an operational advantage over traditional wheel-mounted systems in that the time required for sensor compensation is dramatically shorter. This is achieved by the use of the rolling compensation methods which compensate all four wheels simultaneously without the need to jack up the vehicle. In addition, the amount of wheel rotation required for compensation of a machine-vision alignment system is 60 degrees or less, as compared to the wheel-mounted sensor systems which require a minimum of 180 degrees.

Accordingly, it would be advantageous to provide a method for compensating axial misalignment between wheel-mounted alignment sensors and the axis of rotation for an associated wheel which can compensate sensors on all wheels of a vehicle simultaneously without requiring jacking of the vehicle off a supporting surface, and which only requires a wheel rotation through an arc of 60 degrees or less.

BRIEF SUMMARY OF THE INVENTION

Briefly stated, the present disclosure provides a method for compensating axial misalignment between wheel-mounted alignment sensors and an axis of rotation for an associated wheel. The method compensates sensors mounted to each wheel of a vehicle simultaneously, without requiring jacking of the vehicle wheels above a supporting surface, and which only requires wheel rotational movement over an arc of 60 degrees or less. The method utilizes measurements of a change in a wheel toe angle and measurements of a change in a wheel camber angle, during a measured rotational movement of the wheel, to identify sinusoidal variation in the respective toe and camber angles during the wheel's rotational movement, from which a measure of axial misalignment between the wheel-mounted alignment sensor axis of rotation and the wheel axis of rotation is identified.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIGS. 5A and 5B illustrate the short range of rolling movement of a vehicle from a first position to a second position as required for the procedures of the present disclosure;

Figure 1:
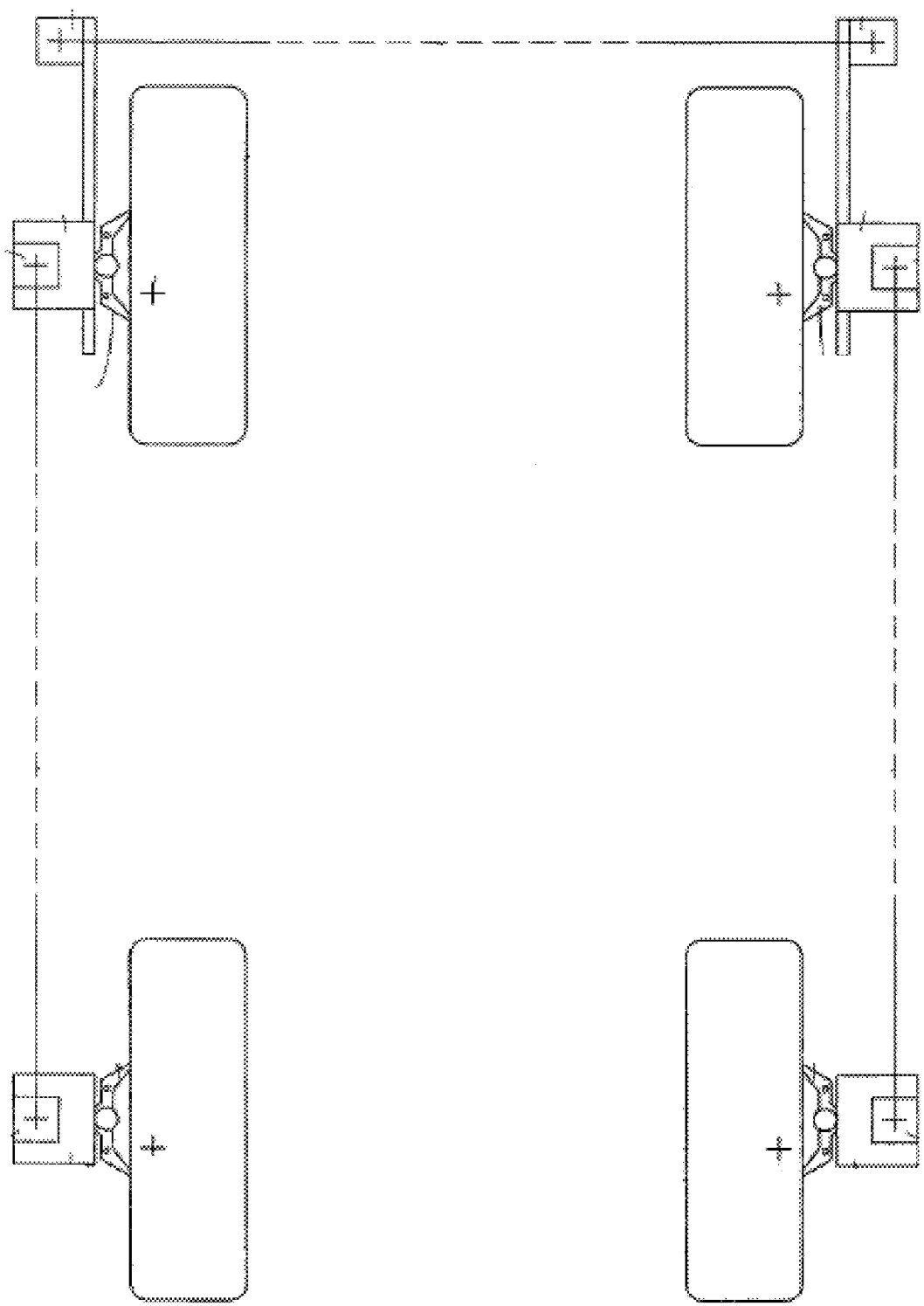
FIG. 1 illustrates a prior art vehicle wheel alignment system with wheel-mounted sensors.
Figure 2:
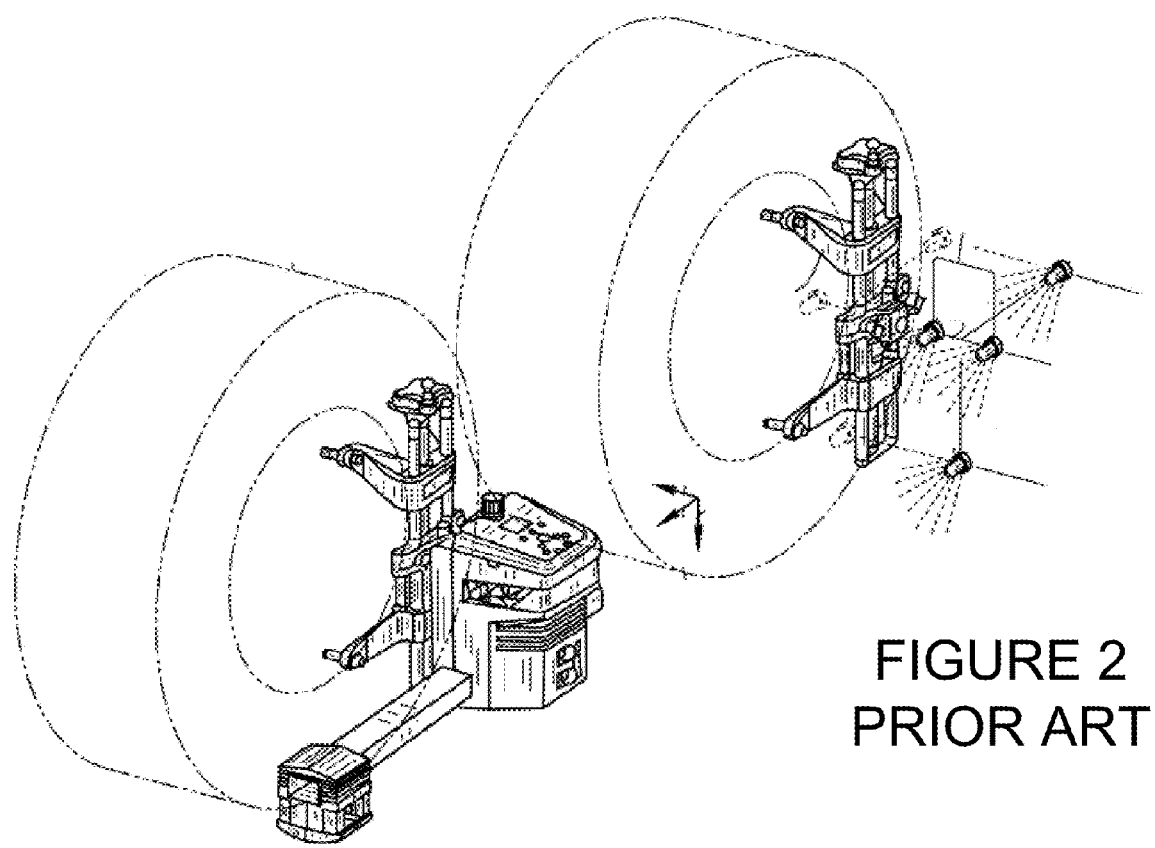
FIG. 2 illustrates a second prior art vehicle wheel alignment system with wheel-mounted sensors.

Corresponding reference numerals indicate corresponding parts throughout the several figures of the drawings. It is to be understood that the drawings are for illustrating the concepts set forth in the present disclosure and are not to scale. Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The present disclosure provides a method for compensating axial misalignment between active, wheel-mounted alignment sensors and an axis of rotation for a wheel on which the sensor is mounted by obtaining sensor readings over a wheel rotational arc of less than 180 degrees, and preferably over an arc of 60 degrees or less, such as shown in FIGS. 5A and 5B. The typical active wheel-mounted alignment sensor incorporates at least a wheel rotation encoder, a camber angle transducer, and a toe angle transducer, and freely rotates about an axis of rotation as the wheel is rotated, maintaining a generally level orientation. Often, additional transducers are included such as a caster angle transducer and a cross-looking toe angle transducer, but these additional sensors are not required for the sensor compensation procedures of the present disclosure. The rotation encoder, camber transducer, and toe transducer can be of conventional construction, such as shown in U.S. Pat. No. 6,313,911 B1 to Stieff or in U.S. Pat. No. 6,483,577 B2 to Stieff, both of which are herein incorporated by reference. Toe transducers incorporating linear array CCD or CMOS imaging sensors are ideal for cost reasons, but any other style of toe transducer can be used with the present methods. The use of two-dimensional imaging arrays as transducers is not required.

In machine vision alignment systems it is well known that the pose of a passive wheel-mounted optical target with respect to an observing camera can be described by a rotation matrix Rot plus a translation matrix Tr. Points in the coordinate system defined by the optical target can be transformed to points in the coordinate system defined by the observing camera by multiplication by the rotation matrix Rot and addition of the translation matrix Tr. When a vehicle having wheel-mounted targets and sensors is rolled a short distance, the pose of the wheel mounted targets changes, and a new set of rotation and translation values are calculated. With these two sets of data, the direction of the axis of rotation of the wheel, associated with the observed wheel-mounted target can be determined using known mathematical manipulations. In the case of a wheel-mounted sensor, the camera coordinate system and the target coordinate system are superimposed on each other so the translation matrix Tr is populated with zero values, and is not used. The remaining rotation matrix Rot is all that is necessary to perform the calculations. The rotation matrix Rot is defined as a 3×3 orthonormal matrix describing the rotation of the observed target about the three mutually perpendicular axis X, Y, and Z of the camera coordinate system. The rotation matrix Rot is constructed by identifying a toe angle rotation, a camber angle rotation, and an associated wheel rotation angle. Each of these rotations can be described by their own individual rotation matrix Rot about their reference axis X, Y, or Z. The toe angle is represented by a pure rotation about the X axis, the camber angle is represented by a rotation about the Y axis, and the wheel roll is represented by a rotation about the Z axis. The rotation matrix is then established as the product of all three individual rotations.

$$[\text{Rot}, XYZ] = [\text{Rot}, X] \times [\text{Rot}, Y] \times [\text{Rot}, Z] \qquad \text{Eqn. 1}$$

where:

$$\text{Eqn.2.} \quad [Rot, X] = \begin{bmatrix} 1 & 0 & 0 \\ 0 & \cos & -\sin \\ 0 & \sin & \cos \end{bmatrix}$$

$$\text{Eqn.3.} \quad [Rot, Y] = \begin{bmatrix} \cos & 0 & \sin \\ 0 & 1 & 0 \\ -\sin & 0 & \cos \end{bmatrix}$$

$$\text{Eqn.4.} \quad [Rot, Z] = \begin{bmatrix} \cos & -\sin & 0 \\ \sin & \cos & 0 \\ 0 & 0 & 1 \end{bmatrix}$$

Figure 6:
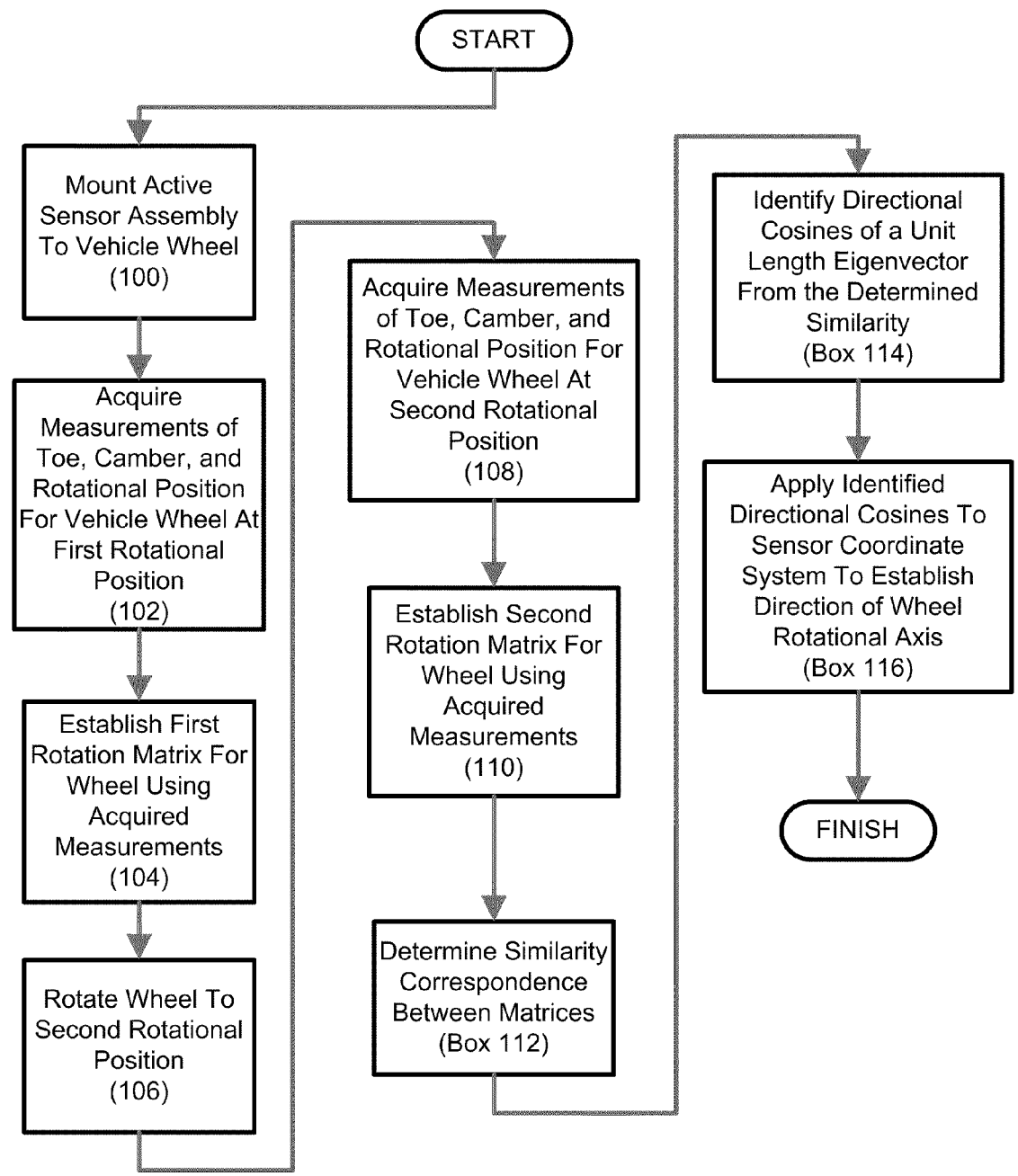
FIG. 6 is a flow chart illustrating a procedure for determining a wheel axis of rotation using a wheel mounted active sensor.

With the method of the present disclosure, such as shown in the flow-chart of FIG. 6, the individual toe angle, camber angle, and wheel rotational position readings from two rotational positions of a conventional active wheel-mounted sensor during a compensation rolling movement of the vehicle of are used to construct $[\text{Rot},XYZ]_1$ and $[\text{Rot},XYZ]_2$. Initially, an active sensor is mounted to a vehicle wheel (Box 100), and measurements of the wheel rotational position, camber angle, and toe angle are obtained (Box 102). Rotational position readings may be obtained from a rotary encoder included with the active sensor, which records the rotational movement of the sensor about an axis of rotation as the wheel is rolled between the two rotational positions. A first rotation matrix $[\text{Rot},XYZ]_1$ is established from the acquired measurements at the first rotational position of the vehicle wheel (Box 104). The vehicle wheel is then rotated to a second rotational position (Box 106), and the measurements are repeated (Box 108) to establish the second rotation matrix $[\text{Rot},XYZ]_2$ (Box 110).

The rotation axis of the wheel is found by solving the similarity between the two matrices, (Box 112) as shown in U.S. Pat. No. 6,894,771 B1 to Dorrance et al., herein incorporated by reference. The process requires initially creating a third matrix $[\text{Rot},XYZ]_{1,2}$ by multiplying $[\text{Rot},XYZ]_1$ by the inverse of the $[\text{Rot},XYZ]_2$ matrix and solving for its eigenvalues and eigenvectors.

$$[\text{Rot}, XYZ]_{1,2} = [\text{Rot}, XYZ]_1 \times ([\text{Rot}, XYZ]_2)^{-1} \qquad \text{Eqn. 5.}$$

$$[U, T] = \text{decomposition}[\text{Rot}, XYZ]_{1,2} \qquad \text{Eqn. 6.}$$

T is a 3×3 matrix which contains the eigenvalues of the decomposed $[\text{Rot},XYZ]_{1,2}$ matrix and U is the orthonormal matrix of the eigenvectors of the decomposed $[\text{Rot},XYZ]_{1,2}$ matrix. The matrix T is searched for the column where the eigenvalue 1.00 is found. The corresponding column of the matrix U contains the direction cosines of the unit length eigenvector for the axis of rotation (Box 114). These cosines are applied to the base coordinate system of the sensor to identify the direction of the axis of rotation (Box 116).

The other two diagonal elements of matrix T are the remaining eigenvalues, and are the complex conjugates of each other. The real part is the cosine of the angle through which the wheel is rotated between the first and second positions and the imaginary part is the sine of the angle. The other two columns of matrix U form unit vectors that are mutually perpendicular to each other and to the eigenvector for the axis of rotation. Thus they are a coordinate system where one axis is the axis of rotation.

Figure 3A:
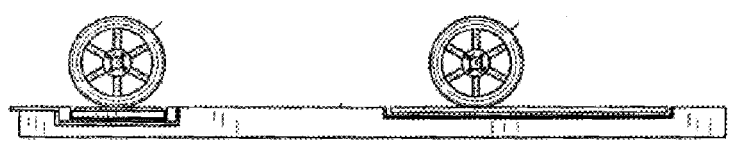
FIGS. 3A through 3C illustrate the rolling movement of a vehicle during optical target rotational axis compensation.
Figure 3B:
Figure 3C:
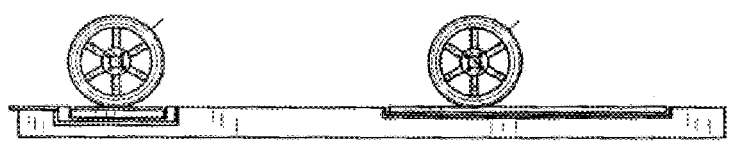
Figure 4:
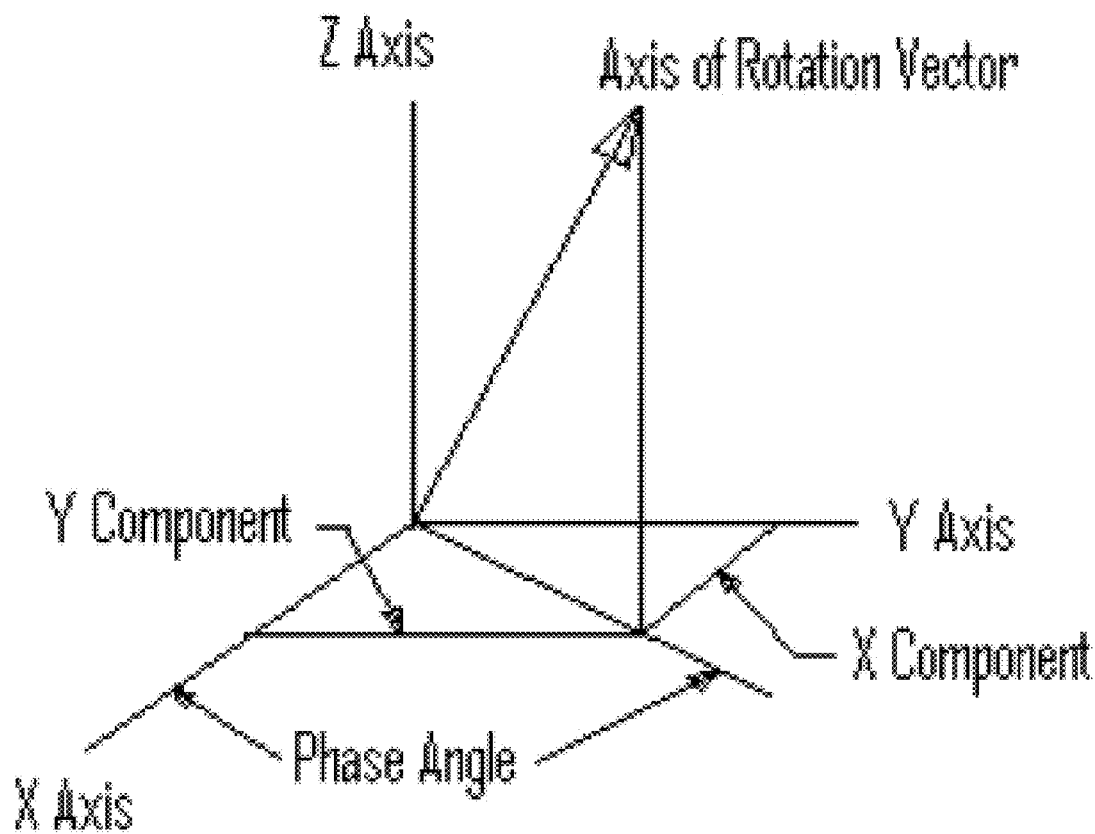
FIG. 4 is an illustration of the vectors and axis associated with a phase angle calculation of the present disclosure.

During wheel rotation, the phase angle, shown in FIG. 3, is the wheel rotational angle at which the maximum axial runout for the wheel-mounted sensor occurs from the wheel axis of rotation. In the established coordinate system shown in FIG. 3, the wheel rolls about the Z axis. By projecting the wheel axis of rotation vector on to the X,Y plane, its components in each direction can be used to define the phase angle. The direction cosines of the axis of rotation vector are the projection of the unit vector on to each individual axis X and Y. The wheel rotational angle of maximum runout defined with respect to the X axis, and using the right hand rule for the positive angle direction is:

$$\text{Eqn.7.} \quad \text{Phase\_Angle} = a\tan 2\left(\frac{\text{Axis\_of\_Rotation\_Y\_Component}}{\text{Axis\_of\_Rotation\_X\_Component}}\right)$$

The a tan 2 function is used so that the proper quadrant can be identified. With the phase angle, maximum runout, and quadrant defined, a sinusoidal wave which is representative of the amount of runout at any rotational position of the wheel can be mathematically determined, and employed to compensate the wheel mounted sensor for any rotational position of the vehicle wheel.

Figure 7:
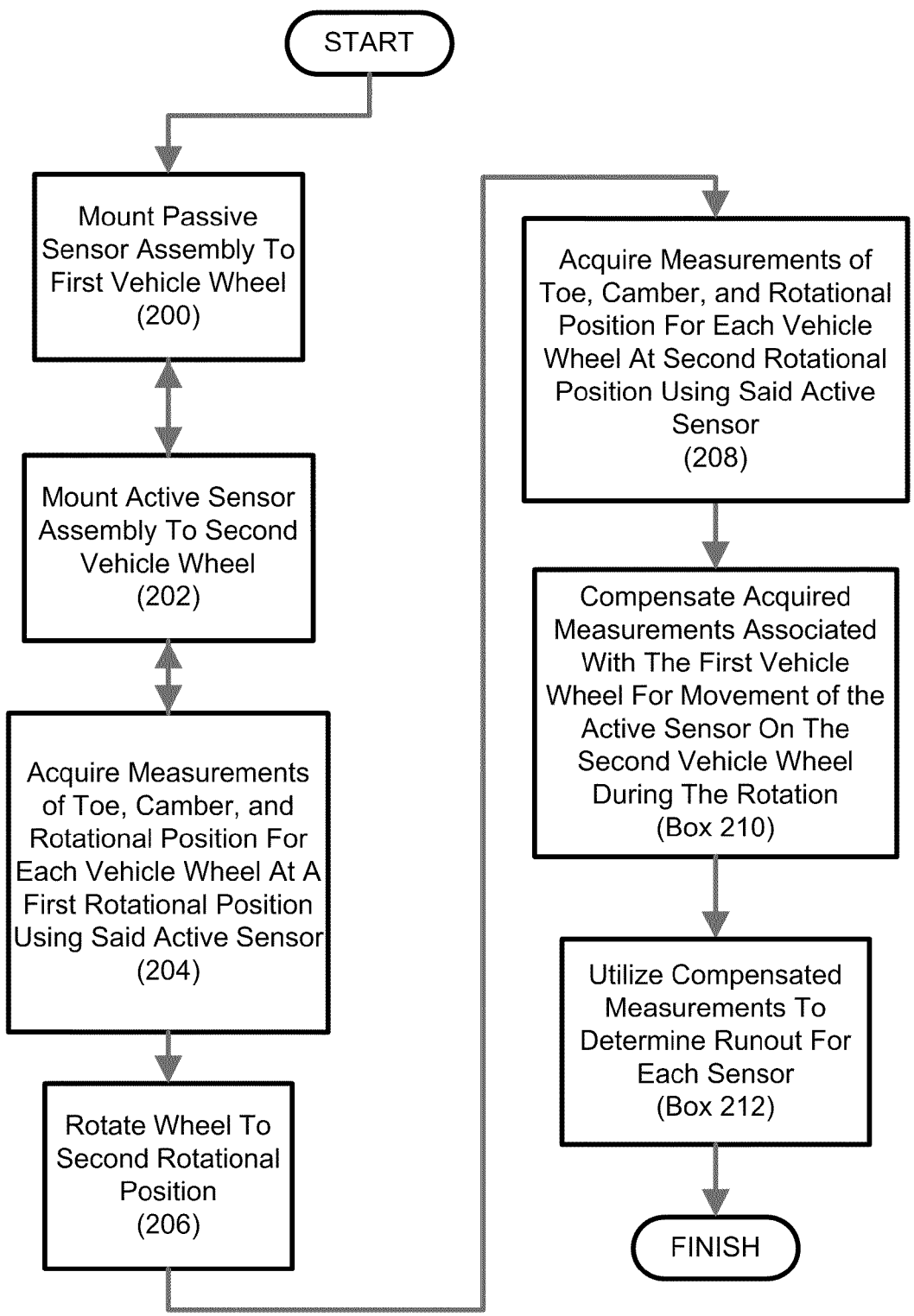
FIG. 7 is a flow chart illustrating a procedure for compensating measurements associated with a passive sensor mounted to a first wheel for movement of an observing active sensor mounted to a second wheel of the vehicle.

If the wheel alignment system is configured with a passive element (i.e. a target) on one wheel, whose pose is measured by an active sensor (i.e. camera) on another adjacent wheel, errors in the pose measurement will occur during a rolling compensation procedure. When the vehicle is rolled, both the passive element and the active sensor will be moving at the same time. Therefore, the readings for the passive element (i.e. target) will be the sum of the movement of the passive element and the active sensor together. As illustrated in FIG. 7, to determine the correct readings for the passive sensor element mounted to a first wheel of the vehicle (Box 200), which is observed by an active sensor element mounted to a second wheel of the vehicle (Box 202), changes in sensor measurements between a first rotational position (Box 204) and a second rotational position (Box 208) following rotation of the wheels (Box 206) must be compensated for the movement of the active sensor element observing the passive sensor element. The active sensor's camber transducer reading, in conjunction with the active sensor's individual toe transducer reading, used to provide the necessary corrections (Box 210). Using the corrected measurements, runout associated with each sensor and wheel combination can be subsequently determined (Box 212), as previously described.

In general, using the methods of the present disclosure, the sensor readings for toe and camber, acquired at the beginning and end of the compensation roll, along with the wheel rotation encoder readings, are applied using a sine wave model for the movement of the wheel.

For Camber:

$$C1 = A * \mathrm{Sin}(R1+P) \qquad \text{Eqn. 8.}$$

$$C2 = A * \mathrm{Sin}(R2+P) \qquad \text{Eqn. 9.}$$

For Toe:

$$T1 = A * \mathrm{Cos}(R1+P) \qquad \text{Eqn. 10.}$$

$$T2 = A * \mathrm{Cos}(R2+P) \qquad \text{Eqn. 11.}$$

where:
C1 and C2 are the camber readings at the beginning and end of the compensation roll;
T1 and T2 are the toe readings at the beginning and end of the compensation roll;
R1 and R2 are the angular readings of the wheel rotational position encoder at the beginning and end of the roll;
A is the unknown amplitude of the sine wave; and
P is the unknown phase angle of the sine wave.

The phase angle, P, can be calculated by solving both camber equations or both toe equations for A and equating them. The results are:

$$\text{Eqn.12.} \quad \mathrm{Tan}(P) = \frac{\frac{\mathrm{Sin}(R1)}{C1} - \frac{\mathrm{Sin}(R2)}{C2}}{\frac{\mathrm{Cos}(R2)}{C2} - \frac{\mathrm{Cos}(R1)}{C1}} \text{ or}$$

$$\text{Eqn.13.} \quad \mathrm{Tan}(P) = \frac{\frac{\mathrm{Cos}(R1)}{T1} - \frac{\mathrm{Cos}(R2)}{T2}}{\frac{\mathrm{Sin}(R1)}{T1} - \frac{\mathrm{Sin}(R2)}{T2}}$$

Once the phase angle, P, is determined, the value for P is substituted into either Eqns. 8 and 9 or Eqns. 10 and 11 to solve for the amplitude A.

Next, the active sensor movement in the camber plane is uniquely determined. The movement of the active sensor in the toe plane is determined by incrementing the phase angle by 90 degrees and recalculating the values at wheel rotation angles R1 and R2. The camber and toe changes of the active sensor during the move are subtracted from the passive element readings to obtain corresponding corrected values. Other methods are available to determine the corrections needed, such as wavelet decomposition, but the increase in computational complexity is a deterrent.

Using these procedures, wheel-mounted sensors may be compensated for misalignment from a wheel's rotational axis using a vehicle rolling procedure wherein the amount of wheel rotation required ranges from 30 to 60 degrees, or between 7 to 14 inches of linear travel for a representative 26-inch tire diameter. The procedure permits sensors at each wheel to be compensated at the same time with a short roll distance. The sensors can be either active or passive, or a combination of active and passive sensors. The time required to compensate the wheel-mounted sensors and to obtain alignment readings is generally comparable to that required for compensating wheel-mounted optical targets in a machine-vision wheel alignment system.

The present disclosure can be embodied in-part in the form of computer-implemented processes and apparatuses for practicing those processes. The present disclosure can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for identifying an axis of rotation for a vehicle wheel using a wheel-mounted alignment sensor configured to acquire at least toe angle measurements, camber angle measurements, and wheel rotational position measurements, comprising:
mounting the alignment sensor to the wheel;
acquiring toe angle and camber angle measurements at the wheel-mounted alignments sensor for a first measured rotational position of the wheel;
rolling the wheel through an arc of rotation to a second measured rotational position, said alignment sensor freely rotating about an axis of rotation as said wheel is rolled, maintaining a generally horizontally level orientation;
acquiring toe angle and camber angle measurements at the wheel-mounted alignments sensor for the second measured rotational position of the wheel;
establishing a rotational matrix for each of said first and second measured rotational positions of the wheel;

determining a mathematical similarity between each of said rotational matrices, said mathematical similarity identifying a wheel rotational axis.

2. The method of claim 1 wherein the rotation matrix [Rot,XYZ] a rotational position of the wheel is determined by solving the equation:

$$[Rot, XYZ] = [ROT, X] \times [Rot, Y] \times [Rot, Z]$$

where $$[Rot, X] = \begin{bmatrix} 1 & 0 & 0 \\ 0 & \cos & -\sin \\ 0 & \sin & \cos \end{bmatrix}$$

$$[Rot, Y] = \begin{bmatrix} \cos & 0 & \sin \\ 0 & 1 & 0 \\ -\sin & 0 & \cos \end{bmatrix}$$

$$[Rot, Z] = \begin{bmatrix} \cos & -\sin & 0 \\ \sin & \cos & 0 \\ 0 & 0 & 1 \end{bmatrix}$$

and where [Rot,X] represents a rotation of the measured toe angle about the X-axis, [Rot,Y] represents a rotation of the measured camber angle about the Y-axis, and [Rot,Z] represents a measured rotational position of the wheel about the Z-axis.

3. The method of claim 1 wherein said arc of rotation is less than 180 degrees.

4. The method of claim 1 further including the steps of identifying said first measured rotational position of said wheel with a rotary encoder associated with, and rotating with, said sensor assembly about said axis of rotation; and
identifying said second measured rotational position of said wheel with said rotary encoder.

5. The method of claim 1 wherein said first and second measured rotational positions are separated by a rotational arc of less than 180 degrees.

6. The method of claim 5 wherein said rotational arc is within a range of 30 to 60 degrees.

7. A method for identifying an axis of rotation for a vehicle wheel using a wheel-mounted alignment sensor configured to acquire at least toe angle measurements, camber angle measurements, and wheel rotational position measurements, comprising:
mounting the alignment sensor to the wheel;
acquiring toe angle and camber angle measurements at the wheel-mounted alignments sensor for a first measured rotational position of the wheel;
rolling the wheel through an arc of rotation to a second measured rotational position;
acquiring toe angle and camber angle measurements at the wheel-mounted alignments sensor for the second measured rotational position of the wheel;
establishing a rotational matrix for each of said first and second measured rotational positions of the wheel;
determining a mathematical similarity between each of said rotational matrices by developing a third rotational matrix $[Rot,XYZ]_{1,2}$ by multiplying the first rotational matrix with the inverse of the second rotational matrix; and
decomposing said third rotational matrix to identify matrices of eigenvalues and eigenvectors associated with an identifiable wheel axis of rotation.

8. The method of claim 7 further including the steps of identifying directional cosines of a unit length eigenvector for the vehicle wheel axis of rotation from said matrices of eigenvalues and eigenvectors; and
applying said identified directional cosines to a selected coordinate system to establish a direction for the vehicle wheel axis of rotation.

9. The method of claim 7 wherein said alignment sensor is free to rotate about an axis of rotation relative to said vehicle wheel during rotation from said first measured rotational position to said second measured rotational position, and wherein measurements of said first and second rotational positions are acquired by a rotary encoder associated with said sensor assembly.

10. The method of claim 7 wherein said first and second measured rotational positions are separated by a rotational arc of less than 180 degrees.

11. The method of claim 8 wherein said step of decomposing said third rotation matrix produces a matrix [T] of associated eigenvalues and a matrix [U] of associated eigenvectors; and
wherein said step of identifying directional cosines of said unit length eigenvector includes searching matrix [T] to locate a column containing an eigenvalue of 1.00, with a corresponding column of matrix [U] containing said directional cosines of said unit length eigenvector for the vehicle wheel axis of rotation.

12. The method of claim 8 further including the step of mathematically projecting the identifiable vehicle wheel axis of rotation onto a X-Y coordinate plane, whereby the directional cosines of the vehicle wheel axis of rotation are the projections of unit vectors onto each individual X and Y axis, and
whereby the wheel rotational angle of maximum runout for said sensor assembly is defined with respect to the X-axis according to the equation $$\text{Phase\_Angle} = a\tan 2\left(\frac{\text{Axis\_of\_Rotation\_Y\_Component}}{\text{Axis\_of\_Rotation\_X\_Component}}\right).$$

13. The method of claim 10 wherein said rotational arc is within a range of 30 to 60 degrees.

14. The method of claim 12 further including the step of determining a sinusoidal representation of runout for said alignment sensor mounted to said vehicle wheel using said wheel rotational angle of maximum runout and a measure of said maximum runout.

15. A method for identifying an axis of rotation for a vehicle wheel using a wheel-mounted alignment sensor configured to acquire at least toe angle measurements, camber angle measurements, and wheel rotational position measurements, comprising:
mounting the alignment sensor to the wheel;
acquiring toe angle and camber angle measurements at the wheel-mounted alignments sensor for a first measured rotational position of the wheel;
rolling the wheel through an arc of rotation to a second measured rotational position;
acquiring toe angle and camber angle measurements at the wheel-mounted alignments sensor for the second measured rotational position of the wheel;
establishing a rotational matrix for each of said first and second measured rotational positions of the wheel;
determining a mathematical similarity between each of said rotational matrices using a third rotational matrix $[Rot,XYZ]_{1,2}$ constructed by multiplying the first rotational matrix with the inverse of the second rotational matrix; and
decomposing said third rotational matrix to identify matrices associated with an identifiable wheel axis of rotation.

* * * * *